(12) United States Patent
Brunhuber et al.

(10) Patent No.: US 11,511,343 B2
(45) Date of Patent: Nov. 29, 2022

(54) METHOD FOR MODULAR ADDITIVE MANUFACTURING OF A COMPONENT AND A COMPONENT

(71) Applicant: Siemens Energy Global GmbH & Co. KG, Munich (DE)

(72) Inventors: Christian Brunhuber, Auerbach (DE); Henning Hanebuth, Pliening OT Gelting (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 473 days.

(21) Appl. No.: 16/089,580

(22) PCT Filed: Mar. 22, 2017

(86) PCT No.: PCT/EP2017/056843
§ 371 (c)(1),
(2) Date: Sep. 28, 2018

(87) PCT Pub. No.: WO2017/182221
PCT Pub. Date: Oct. 26, 2017

(65) Prior Publication Data
US 2019/0126352 A1 May 2, 2019

(30) Foreign Application Priority Data
Apr. 19, 2016 (DE) .......................... 102016206547.5

(51) Int. Cl.
*B22F 7/06* (2006.01)
*B33Y 10/00* (2015.01)
(Continued)

(52) U.S. Cl.
CPC .............. *B22F 7/062* (2013.01); *B22F 3/105* (2013.01); *B22F 5/04* (2013.01); *B22F 10/20* (2021.01);
(Continued)

(58) Field of Classification Search
CPC ...... B22F 3/1055; B22F 5/04; B22F 2998/10; B22F 5/009; B22F 2003/247; B22F 3/105;
(Continued)

(56) References Cited

U.S. PATENT DOCUMENTS 2,649,273 A 8/1953 Honegger
3,857,542 A 12/1974 Heymann
(Continued)

FOREIGN PATENT DOCUMENTS

CN 103492096 A 1/2014
DE 102006049216 A1 4/2008
(Continued)

OTHER PUBLICATIONS

English translation of WO-2016096417-A1 (Year: 2016).*
International Search Report dated Jun. 16, 2017, for PCT/EP2017/056843.

*Primary Examiner* — Chris Q Liu

(57) ABSTRACT

A method for the additive manufacturing of a component having the following steps: additively building up multiple sub-sections for the component using a powder bed-based method, arranging the sub-sections to form a composite and additively completing the component, wherein material is deposited, by a deposition welding method, along a peripheral direction around the composite of the sub-sections in such a way that the sub-sections are integrally bonded to each other.

13 Claims, 4 Drawing Sheets

(51) Int. Cl.
*B23K 26/342* (2014.01)
*B22F 3/105* (2006.01)
*B22F 5/04* (2006.01)
*B23K 101/00* (2006.01)
*B23K 26/00* (2014.01)
*B22F 10/20* (2021.01)
*B23K 103/18* (2006.01)

(52) U.S. Cl.
CPC ........ *B23K 26/0006* (2013.01); *B23K 26/342* (2015.10); *B33Y 10/00* (2014.12); *B22F 2998/10* (2013.01); *B23K 2101/001* (2018.08); *B23K 2103/26* (2018.08); *Y02P 10/25* (2015.11)

(58) Field of Classification Search
CPC .... B22F 7/06; B22F 7/062; B22F 2003/1056; B22F 2005/005; B22F 3/008; B22F 5/10; B22F 5/106; B22F 7/08; B23K 2101/001; B23K 26/342; B23K 2103/26; B23K 26/32; B23K 2103/14; B23K 2103/18; B23K 2103/52; B23K 26/0006; B23K 26/142; B23K 26/144; B23K 26/244; B23K 26/324; B23K 26/34; B23K 26/702; B23K 35/0244
USPC ...................................... 219/76.1, 76.14, 634
See application file for complete search history.

(56) References Cited

U.S. PATENT DOCUMENTS

| | | | |
|---|---|---|---|
| 6,384,365 B1* | 5/2002 | Seth | C04B 37/005 219/76.13 |
| 7,093,359 B2* | 8/2006 | Morrison | F01D 5/282 264/257 |
| 2004/0056022 A1 | 3/2004 | Meiners et al. | |
| 2011/0052412 A1 | 3/2011 | Ader et al. | |
| 2013/0101423 A1* | 4/2013 | Roy | F01D 5/147 416/223 R |
| 2014/0044982 A1 | 2/2014 | Suh | |
| 2015/0037162 A1 | 2/2015 | James | |
| 2015/0224607 A1* | 8/2015 | Bruck | B23K 25/005 219/73.21 |
| 2016/0045990 A1 | 2/2016 | Bruck | |
| 2016/0090845 A1 | 3/2016 | Shuck | |
| 2018/0161872 A1 | 6/2018 | Brunhuber | |

FOREIGN PATENT DOCUMENTS

| | | | |
|---|---|---|---|
| DE | 102013220983 A1 | 4/2015 | |
| DE | 102014221423 A1 | 4/2016 | |
| DE | 102015210744 A1 | 12/2016 | |
| EP | 1355760 B1 | 5/2005 | |
| EP | 2586972 A2 | 5/2013 | |
| EP | 2756909 A1 | 7/2014 | |
| WO | WO-2016096417 A1 * | 6/2016 | B33Y 10/00 |

\* cited by examiner

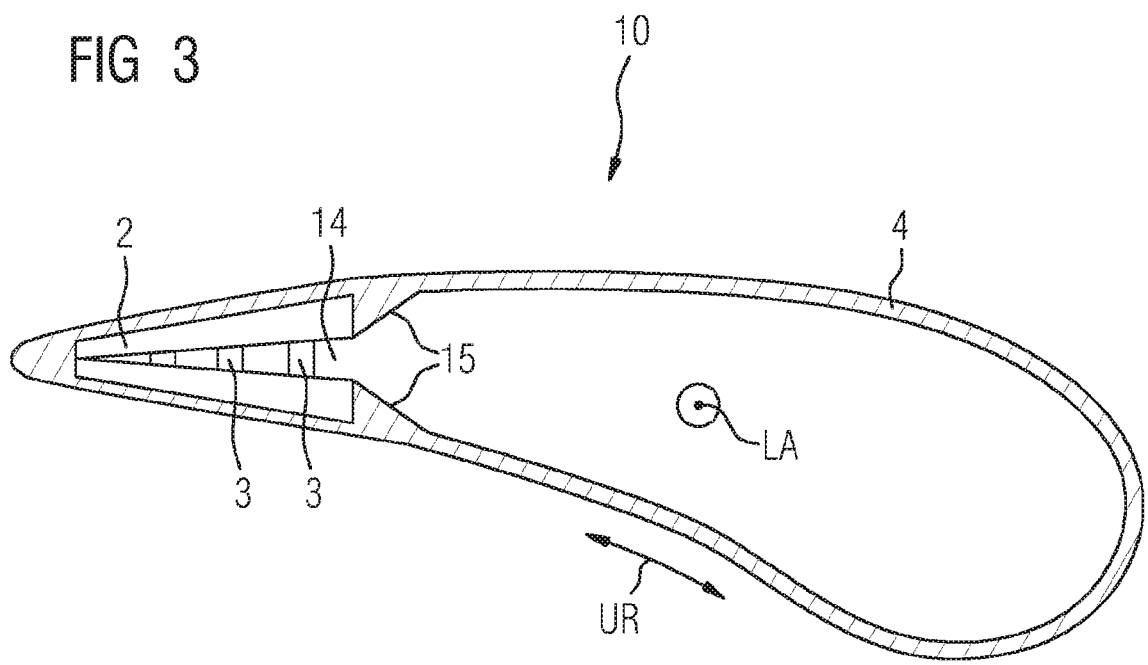
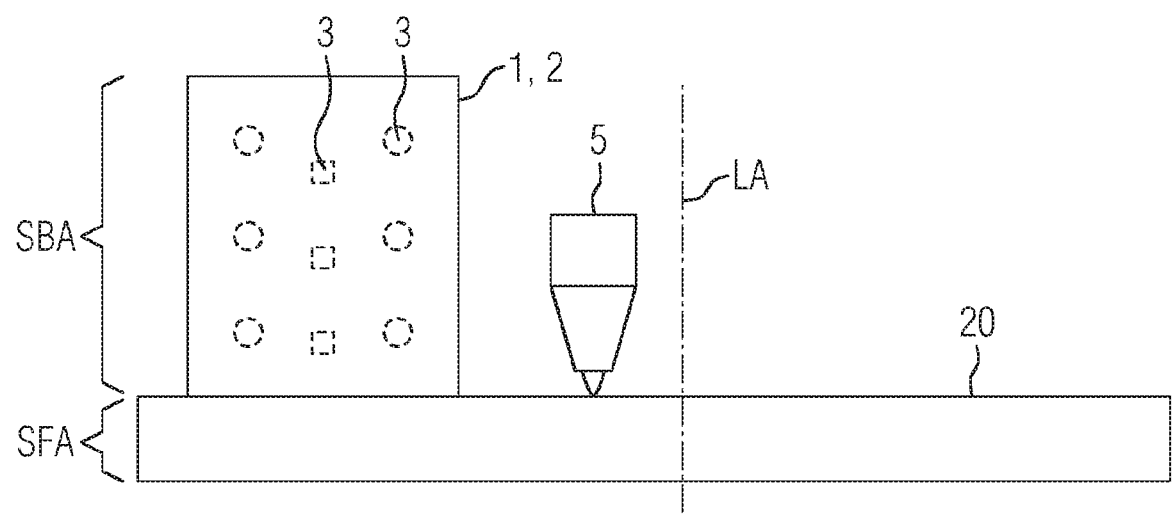

METHOD FOR MODULAR ADDITIVE MANUFACTURING OF A COMPONENT AND A COMPONENT

CROSS REFERENCE TO RELATED APPLICATIONS

This application is the US National Stage of International Application No. PCT/EP2017/056843 filed Mar. 22, 2017, and claims the benefit thereof. The International Application claims the benefit of German Application No. DE 102016206547.5 filed Apr. 19, 2016. All of the applications are incorporated by reference herein in their entirety.

FIELD OF INVENTION

The present invention relates to a method for additive, especially modular, manufacturing of a component or workpiece and also to a component which is manufactured, or can be manufactured, by means of the method.

The component is advantageously intended for use in a turbomachine, in particular a gas turbine. The component is in particular a turbine blade and/or a blade airfoil of a turbine blade.

BACKGROUND OF INVENTION

Generative or additive manufacturing methods are for example laser deposition welding (LMD) or selective laser melting (SLM).

A deposition welding method is known for example from EP 2 756 909 A1.

A method for selective laser melting on the other hand is known for example for EP 1 355 760 B1.

For manufacturing a component from a powder bed, for example by means of SLM, the powder bed is exposed for example to a laser beam according to a predetermined exposure geometry, wherein corresponding data is advantageously retrieved from a 3D-CAD-dataset.

Additive manufacturing methods in the field of AM ("additive manufacturing") have proved to be particularly advantageous for complex components or components of complicated or delicate design, for example lightweight structures. In particular, additive manufacturing is advantageously characterized by a particularly short chain of process steps since a manufacturing or production step of the component can sometimes be carried out directly on the basis of a CAD-dataset.

Furthermore, additive manufacturing is particularly advantageous for the development or manufacturing of prototypes which for example cannot be manufactured or manufactured efficiently by means of conventional, subtractive, cutting or casting processes for cost reasons.

One problem which is often encountered, however, during additive manufacturing, especially in the case of powder bed-based processes such as selective laser melting, is that the design of the component from the corresponding CAD-dataset cannot easily be reproduced or implemented in respect to production engineering. These limitations can relate both to the geometry and to the material of the component; for example, circular and/or horizontally inlying cavities or passages require support structures in the case of SLM methods which also have to be built up, but are not available in the originally provided design and are not desirable either. A further problem relates to the design of particularly fine surface structures or labyrinthine features or structures which have to be aftermachined and/or freed of surplus powder in the manufactured component or design which is to be produced. This, however, can be complicated or impossible especially on account of the size of the cavities.

Even if, for example in the case of SLM manufacturing of components or component parts, the component orientation, for example relative to the build-up direction, is carried out so that the referenced production-related disadvantages or artifacts, for example due to support structures, are minimized then they are never completely avoided.

SUMMARY OF INVENTION

It is therefore an object of the present invention to specify means by which the referenced problems can be solved. In particular, an improved method and/or an improved component are/is introduced, which method and/or component can advantageously comprise particularly finely distributed internal structures and therefore can be manufactured especially efficiently in respect to time and/or resources.

This object is achieved by means of the subject matter of the independent patent claims. Advantageous embodiments are the subject matter of the dependent patent claims.

One aspect of the present invention relates to a method for the additive manufacturing of a component, in particular a turbine blade or a blade airfoil of a turbine blade, comprising the additive building up of a multiplicity of sections for the component by means of a powder bed-based method. The powder bed-based method can for example be selective laser melting (SLM), selective laser sintering (SLS) or electron beam melting (EBM).

The additive building up or manufacturing can be carried out in a modular manner.

The described sections can be built up by means of the powder bed-based method in series or in parallel.

The method furthermore comprises the arranging, for example the connecting, joining or assembling, of the sections to form a composite, especially a separable composite or amalgamation by the separable fixing or abutting of the sections. The sections are advantageously still not connected to each other in a substance-bonding manner in this step.

The method also comprises the additive finishing of the component, wherein material is deposited along a circumferential direction, at least partially around the composite of the sections by means of a deposition welding method, advantageously laser deposition welding (LMD), in such a way that the sections are connected to each other in a substance-bonding or materially-bonding manner.

As a result of the substance-bonding connecting, the component can advantageously acquire its final dimensional stability. The material, which is deposited by means of the deposition welding method, can form a stabilizing structure.

The expression "finishing" relates in the present case advantageously to the additive build-up, wherein a mechanical aftermachining of the surface of the component is advantageously still not included for the finished manufacture. Alternatively or additionally, "finishing" can mean that for its stabilization at least an outline or a contour of the component or for the component is defined.

The deposition welding method can be a laser powder deposition welding method.

By means of the described method, the aforesaid limitations, which customarily accompany the powder bed-based manufacturing of component parts or components, for example for turbine blades, can advantageously be circumvented in a simple manner. This particularly refers to components with a particularly complex, or complexly structured, or complex to structure, internal geometry, such as to turbine blades with a supporting and/or cooling passage structure, which is intended to aid the lightweight construction or its cooling during operation. The overall component can, therefore, as is customary in additive manufacturing, be divided for example in a CAD data model into individual segments or sections. Each single one of these sections can then be built up by means of selective laser melting or another powder bed-based method, such as electron beam melting, either in parallel or in series, for example.

The referenced division is expediently carried out in this case so that in the individual modules or sections as few undercuts or cavities as possible occur so that support structures for the powder bed-based method can in the main be advantageously dispensed with.

Also circumvented in this way is the problem of delicate cavities or internal structures—such as in the case of monolithic additive manufacturing of a complete turbine blade from the powder bed—and inner surfaces no longer being able to be aftermachined mechanically or in any other way, and also, for example in the case of labyrinthine geometries, the problem of surplus powder being able to be removed from the interior space only with great difficulty or not all. Instead of this, those surfaces of the individual sections can in the first place be advantageously aftermachined without any problem since initially, that is to say before the additive finishing, they are freely accessible. Secondly, they can also be freed of powder completely and in a simple manner (cf. above).

As a result of the referenced free accessibility of the inner surfaces of the individual sections, a mechanical aftermachining and/or surface treatment on virtually any surface sections of the component are/is especially enabled, which in turn—for example in the case of cooling passages inside the turbine blade—can mean significantly higher cooling efficiency for the component. Consequently, higher operating temperatures of the turbine also become possible, as a result of which the efficiency of energy conversion in turbomachines can also be decisively improved.

Even if support structures are still provided for the powder bed-based build-up of the individual sections, these can also be subsequently removed, i.e. before the finishing of the component, as a result of the free accessibility (cf. below).

As a further advantage of the described method, the deposition of material, at least partially along the circumferential direction, can be carried out by means of deposition welding, i.e. in a particularly quick and time-efficient manner, as a result of which cost advantages can be exploited compared with manufacture of the component exclusively by means of powder bed-based methods.

In particular, geometries or designs which by means of casting techniques are time-consuming and/or particularly very expensive, for example complexly interconnected cavities, for example with a multiplicity of inner transitions or a multi-wall which would require the use of a plurality of casting cores for the component, can be manufactured by means of the present method.

The referenced deposition of material can for example be carried out at least partially circumferentially around the composite. In this case, it is sometimes necessary to take into consideration the material which is additionally deposited by deposition welding for the final dimension of the component, for example by the layer thickness or edge thickness of the (weld) material being calculated beforehand, or by for example recesses already being provided in the geometric design of the sections.

As a result of the described combination of additive powder bed-based manufacturing methods, especially for the individual sections of the component, together with additive deposition welding methods, especially laser powder deposition welding for the finishing of the component, the compatibility of the referenced method types is also advantageously exploited. For the component and both for the partial build-up and for the finishing by means of the described method, the same substances or materials can especially be used, which is especially advantageous or even necessary for heavy-duty components or materials.

In one embodiment, the composite of the sections is completely encased by the material. This embodiment is particularly advantageous for the stability of the component since a complete dimensionally stabilizing structure can be provided by means of the deposition welding technique.

In one embodiment, all the sections or at least a multiplicity of the sections are mutually fixed after the arranging to form the composite or during the arranging to form the composite. The referenced fixing is expediently carried out in any case before the additive finishing. The fixing is especially advantageous in order to maintain a certain manufacturing accuracy for the overall component. For example, the fixing may be necessary in order to prevent a distortion or a mutual loosening of the sections, which are arranged to form the composite, during the finishing.

In one embodiment, the referenced fixing is carried out in a form-fitting manner.

In one embodiment, the referenced fixing is carried out in a force-fitting manner, for example by means of corresponding adhesive connecting means or bonding agents.

The expression "mutually" can in the present case relate to all or only to a multiplicity of the sections to the extent that only two or more of the sections are fixed to each other.

In one embodiment, all the sections or at least a multiplicity of the sections are provided with complementary connecting means or built up with complementary connecting means during the additive building up in such a way that the corresponding sections can then be connected to each other in a form-fitting manner.

In one embodiment, the complementary connecting means are designed to interact via a tongue and groove connection of the corresponding sections. This embodiment enables a form-fitting fixing or connecting in a particularly practical manner, for example along at least one movement axis of the two sections relative to each other.

In one embodiment, at least one of the sections forms an inner wall, an inner walling arrangement or an inner surface of the component. This embodiment is especially expedient since—by means of the described powder bed-based method—inner surfaces with almost any complex geometry can be built up in a simple manner.

When in the present case reference is made to the component, the component which is to be manufactured and/or the already manufactured or produced component is meant.

In one embodiment, all or a multiplicity of the sections form a multi-wall of the component. In particular, a multi-wall can comprise an outer wall and a multiplicity of inner walls or inner transitions. This example advantageously enables an embodiment of the component with a complex but particularly effective cooling passage structure.

In one embodiment, all or a multiplicity of sections are built up in such a way that they define a cavity of the component or for the component which is to be manufactured, especially comprising at least one cooling passage. Alternatively, the component can be provided with a cavity in such a way that advantageously during the additive building up the cavity comprises a multiplicity of cooling passages or an optionally complex cooling structure.

In one embodiment, all or a multiplicity of the sections are built up in such a way that they comprise or form a support structure of the component.

In one embodiment, at least one of the sections is aftermachined, for example mechanically, after the additive building up. The referenced aftermachining can be applied to a surface which later lies on the inside in the component, whereby the aforesaid inventive advantages can be exploited.

In one embodiment, advantageously all the sections are arranged on a prefabricated workpiece. The finished component then advantageously also comprises the referenced prefabricated workpiece.

In one embodiment, the component is a turbine blade comprising a blade root section and a blade airfoil section, especially a rotor blade for a gas turbine.

In one embodiment, the component is a blade airfoil or a blade airfoil section for a turbine blade, especially a rotor blade for a gas turbine.

A further aspect of the present invention relates to a component which is manufactured, or can be manufactured, by means of the described method, furthermore comprising a cavity, especially with at least one cooling passage and/or a support structure. The component, corresponding to the material which is deposited by means of laser deposition welding, comprises weld traces for example. Discernible weld beads, for example, can be subsequently externally machined or removed by means of the described method, for example after the finished build-up.

Embodiments, features and/or advantages, which in the present case relate to the method, can also relate to the component, or vice versa.

BRIEF DESCRIPTION OF THE DRAWINGS

Further details of the invention are described below with reference to the figures.

FIG. 3 shows a schematic plan view of at least one part of a component which is manufactured according to the invention.

FIG. 4 shows a schematic side view of a component which is manufactured according to the invention.

DETAILED DESCRIPTION OF INVENTION

In the exemplary embodiments and figures, the same components, or components functioning in the same way, can be provided with the same designations in each case. The depicted elements and their sizes in relation to each other are in principle not be seen as being true to scale, rather individual elements, for better representation and/or for better understanding, can be shown with dimensions which are exaggerated in thickness or size.

Described with reference to the figures in the present case is an additive manufacturing method according to the invention for a component and also a corresponding component.

Figure 1:
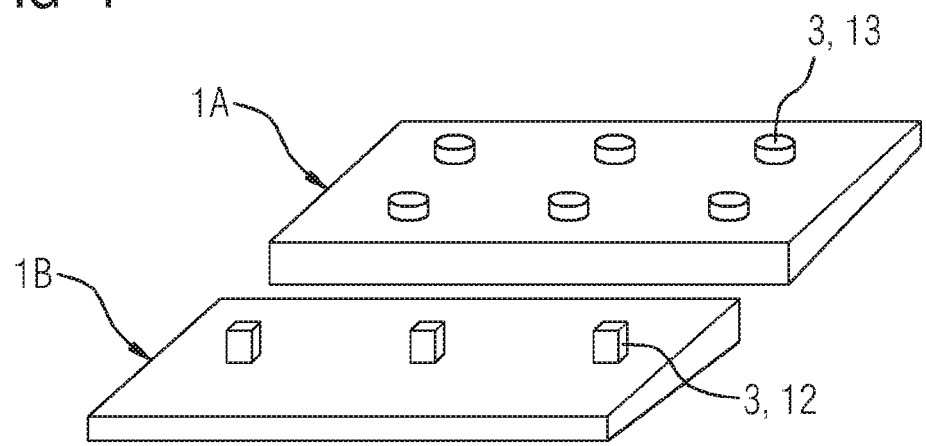
FIG. 1 shows a schematic perspective view of sections which are manufactured according to the invention.

FIG. 1 shows a schematic perspective view of two sections 1 for a component 10 (compare FIGS. 3 to 5) which is to be additively manufactured. The component is advantageously intended for use in a turbomachine, advantageously a gas turbine. The component is especially advantageously a turbine blade and/or a blade airfoil, or a blade airfoil section of a turbine blade. In the case of the blade, it can be a stator blade and a rotor blade.

In particular, one section 1A and one section 1B are shown as sections 1 for the component 10. The sections 1A, 1B can be modules for the referenced component. The sections 1A, 1B have advantageously been built up by means of a powder bed-based additive manufacturing method. This can be carried out both in parallel and in series. In the case the powder bed-based method, it is for example selective laser melting (SLM) or electron beam melting (EBM). These methods are particularly suitable for the manufacturing of turbine components from heavy-duty materials, such as precipitation-hardened or precipitation-hardenable superalloys.

Figure 7A:
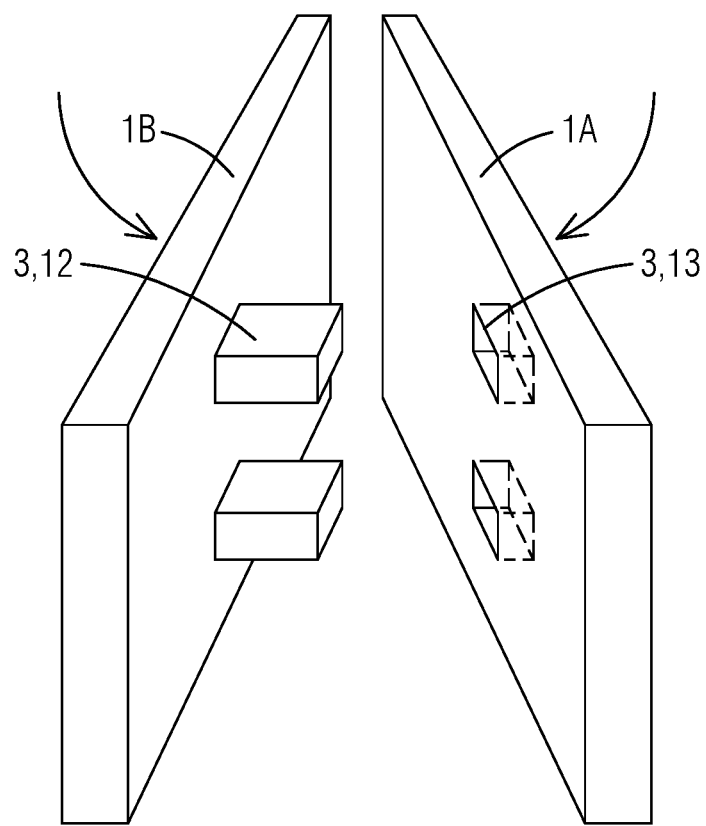
FIG. 7A shows a schematic plan view of an example embodiment of FIG. 3.
Figure 7B:
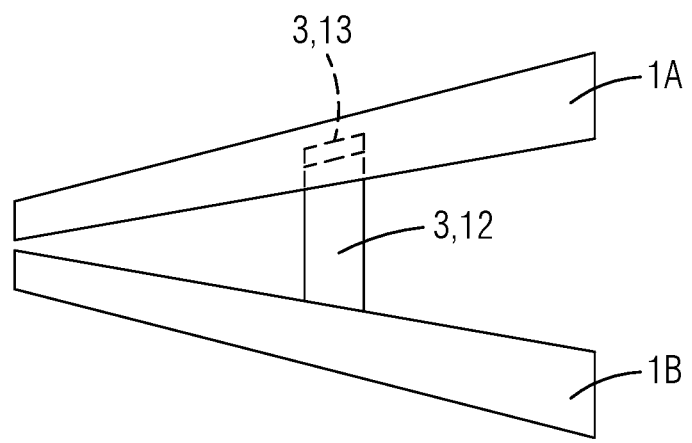
FIG. 7B shows a schematic plan view of the sections of FIG. 3 when assembled to form an example composite.

The sections 1A, 1B comprise in each case connecting means 3. The section 1A comprises a multiplicity of grooves 13, for example, as connecting means 3. The section 1B comprises a multiplicity of tongues or projections 12 as connecting means 3 which are of a design which is complementary to, or corresponding to, the described grooves, advantageously in such a way that the sections 1A, 1B, especially before their final substance-bonding connecting, can be arranged and/or prefixed, forming a composite 2 (compare FIG. 2). In the example embodiment of FIG. 3 depicted in FIG. 7A and FIG. 7B, the projections 12 engage, especially at least partially, in the advantageously correspondingly arranged grooves 13.

By means of the described connecting means 3, the sections 1A, 1B are fixed relative to each other, at least along one, but advantageously along two linearly independent movement axes or movement directions of the sections 1A, 1B, in such a way that a corresponding movement is prevented.

By means of the described tongue and groove connection (compare projections 12 and grooves 13), a form fit can advantageously be produced.

The described mechanical connecting means for fixing the sections 1A, 1B relative to each other are, according to the invention, advantageously built up during the additive manufacturing or provided with the corresponding basic bodies of the sections in the meantime.

Figure 2:
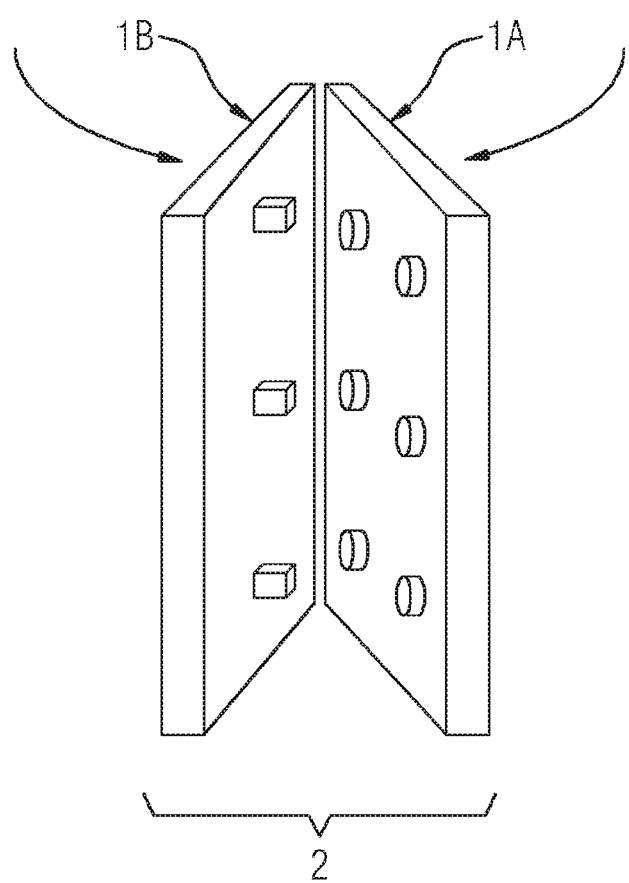
FIG. 2 shows a schematic perspective view of the sections from FIG. 1 which are arranged, for example forming a composite, in accordance with the method according to the invention.

Alternatively or additionally to the views of FIGS. 1 and 2, an adhesive connecting means or a connecting means forming a force fit, for example a bonding agent, can be used as connecting means in order to connect the sections temporarily and/or detachably to each other or mutually.

The side surfaces of the depicted sections which feature the connecting means 3 are advantageously inner surfaces in the subsequent component and can have a predetermined complex structure.

Directly after the additive build-up of the sections 1A, 1B, the sections can be aftertreated according to the invention, for example mechanically or in another way, advantageously in such a way that the referenced inner surfaces are tailored to their ultimate use. In the case of cooling passage structures, the afterworking can for example be carried out in such a way that the component during operation can later be cooled from the inside as efficiently as possible.

Furthermore, support structures, which are frequently used or built up during the powder bed-based additive manufacture for the "supporting" of cavities or undercuts, are not shown in FIGS. 1 and 2 for the sake simplicity. The described modular or partial build-up of the sections can advantageously make a (significant) use of support structures superfluous.

In FIG. 1, the described sections 1A, 1B are shown horizontally for example. According to this orientation, the sections can also be built up on a build-up platform, i.e. horizontally, in the described powder bed-based method, which in particular corresponds to the advantage of a time and powder efficient manufacture. In the horizontal build-up, wherein for example a longitudinal axis or the main extent of the component is arranged perpendicularly to the build-up direction, necessary support structures (compare above) can be arranged or provided on the outer side of the respective section so that they can then be removed in a simple and problem-free manner.

As an alternative to this, the sections 1A, 1B can for example be built up or manufactured from the powder bed in a vertical position. In the vertical build-up, in which for example a longitudinal axis of the corresponding section is oriented along or parallel to a build-up direction of the powder bed-based method, support structures can advantageously be completely, or almost completely, dispensed with.

FIG. 2 in particular shows the composite 2 or the process (compare arrows) of the arranging of the sections, forming the composite 2. The composite 2 comprises the sections 1A, 1B which are described in FIG. 1.

The composite 2 is also shown as a part of a component 10 in FIG. 3, wherein, however, the connecting means 3 of the sections at least partially engage in each other or interact in a complementary manner.

FIG. 3 shows a schematic plan view of a part of a component 10. In the case of the component, it is by way of example a component for a turbomachine, for example a turbine blade.

The component 10 advantageously relates to a turbine blade for a gas turbine with a fine and/or complicated internal structure, for example a support structure or advantageously a cooling passage structure. Although this structure is not shown explicitly in the present FIGS. 1 to 4, the sections can comprise a correspondingly optionally designed geometry which for example defines a cavity (compare designations 14 in FIGS. 3 and 5).

It is evident in FIG. 3 that the connecting means 3 (especially the projections 12) in the finished component are arranged in the cavity 14 of this or extend through this and for example can therefore have a supporting effect (support structure). These features are expediently already taken into consideration in the original conception or design of the sections, for example by means of CAD (computer aided design).

In FIG. 3, the component 10 is also shown as a turbine blade, wherein the (preliminary) composite or the arrangement of the sections 1A, 1B form a cross-sectional area of the turbine blade in the proximity of the trailing edge. At the same time, the interspaces of the connecting means 3 can function as cooling passages.

After the arranging of the sections 1, the additive manufacturing method of the component 10 includes the additive finishing, wherein a material 4 is deposited at least partially on the circumferential side along a circumferential direction UR (compare the double arrow) around the composite 2 of the sections, advantageously by means of a deposition welding method, for example a laser powder deposition welding method, in such a way that the sections are connected to each other in a substance-bonding or materially bonding manner. This is already shown in anticipation by the material 4 in the view of FIG. 3. In other words, the material 4 forms a stabilizing structure of, or for, the component 10. By way of example, it is especially shown in FIG. 3 that the sections 1A, 1B are completely encased by the material 4. Alternatively, only a part of the circumference of the composite 2 can, however, be coated with the material 4 (compare FIG. 5).

The referenced circumferential direction UR advantageously describes one or more directions perpendicularly to a longitudinal axis LA of the component 10 or of a blade airfoil of this.

The circumferential direction UR advantageously also describes one or more directions according to which, or along which, the described composite is at least partially encased by the material 4.

In order to mechanically stabilize the described composite 2 or the sections 1A, 1B, in addition to the described substance-bond with the material 4, the material 4 is advantageously deposited by means of deposition welding in such a way that protrusions 15, which fix or retain the composite 2 relative to the material 4, are built up for the finished component.

In FIG. 4, the described component 10 (cf. FIG. 3) is shown in a side view during its additive manufacture, wherein the described composite 2 is advantageously completely encased by the material 4 along a longitudinal axis LA of the component. Shown by way of example is a deposition welding tool 5, advantageously a tool for laser powder deposition welding, by means of which the tracks for the material 4 are additively applied.

A build-up direction for the material 4 advantageously corresponds to the described longitudinal axis LA or to a direction parallel to this.

The composite which is described further above can especially constitute a blade airfoil section (SBA) of the turbine blade or can extend beyond this. A corresponding blade root section (SFA) is shown beneath the composite 2. This can also be part of the component 10. Alternatively, the component 10 can only relate to the blade airfoil section SBA.

The blade root section SFA can for example be an especially prefabricated workpiece.

Figure 5:
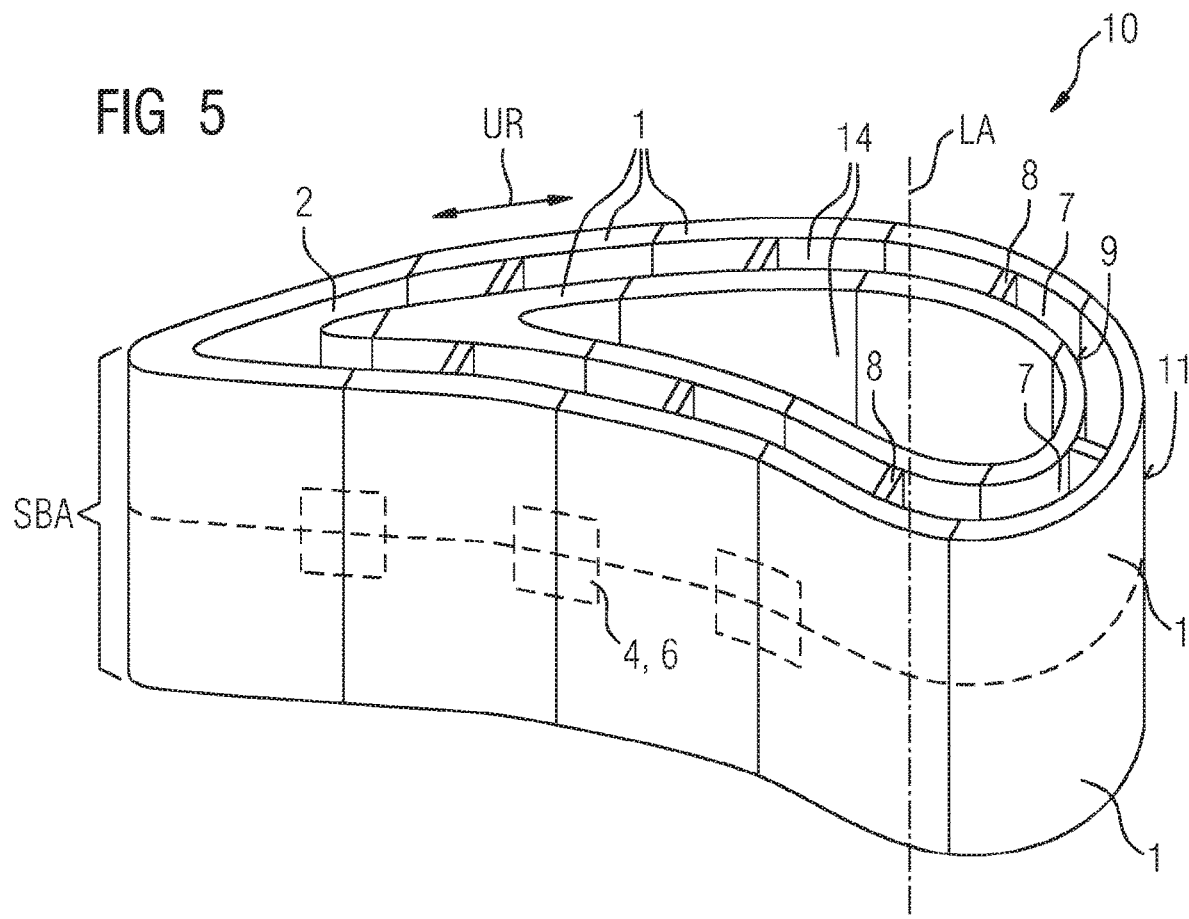
FIG. 5 shows a schematic perspective view of a component which is manufactured according to the invention.

FIG. 5 shows a perspective schematic view of the component 10 according to the invention in an alternative embodiment. According to this embodiment, the component 10 has a complex internal geometry. The component, according to this embodiment, is also a turbine blade which can be cooled from the inside, advantageously a rotor blade for a gas turbine. In particular, the component 10 comprises multi-walling for defining corresponding cooling passages.

The component 10 especially comprises an outer wall or outer walling 11, which is assembled from a multiplicity of sections 1 (compare dashed lines which indicate the limits of the individual sections 10). The sections of the outer wall 11 are advantageously arranged (next to each other) on the circumferential side or along the circumferential direction UR.

The component 10 furthermore comprises an inner wall or inner walling 9. In the same way as the outer wall 11, the inner wall is assembled from individual sections 1.

The outer wall 11 and the inner wall 9 can for example constitute a multi-wall or multi-walling of, or for, the component 10.

The inner wall 9 and/or the outer wall 11 also define(s) a cavity 14.

The component also comprises a support structure 8. The support structure 8 connects the outer wall 11 to the inner wall 9 at a number of points, advantageously in such a way that a particularly suitable mechanical stabilization or support of the structure of the component is effected. Although this is not explicitly shown, the inner wall 9 in itself can also comprise a corresponding support structure 8 or corresponding support structure elements for supporting oppositely disposed regions of the inner wall 9.

The sections 1, as described above, can at least partially be connected to each other and/or mutually fixed, forming a composite, by means of mechanical, especially complementary, connecting means.

Alternatively, the sections can for example be at least partially connected, forming a composite 2, by means of adhesive connecting means, for example bonding agents.

In this case, it may be sufficient that not all, but advantageously only a multiplicity of, or some of, the sections 1 are fixed together or mutually fixed. The pre-fixing or connecting of individual pairs of sections in the overall composite, for example of all the sections, can especially effect a sufficient stabilization of the overall composite 2 so that the component 10 can be finished or built up in the next method step, as described.

The referenced deposition of the material 4 can for example be carried out at least partially on the circumferential side around the composite 2. In this case, it is normally necessary to take into consideration the deposited material 4 for the final dimension of the component by, for example, the (circumferential-side) space of the covering or the contour of the material 4 being calculated beforehand.

The view of FIG. 5 can especially show the composite 2 of all the sections 1. This composite 2 can be completely or only partially encased by the material 4.

It is also provided and expedient according to the invention to deposit the material 4 for example only at the places which overlap "abutments" of the sections 1 of the composite 2. This is indicated by way of example by means of the dashed rectangles at connecting points of four sections in each case. In order to take into consideration the material only at the abutments for the geometry of the overall component 10, the sections can for example be provided with corresponding recesses (not explicitly identified) at the places where material 4 is to be deposited. The sections 1 can especially be correspondingly provided with the recesses via a CAD dataset during the additive manufacture. As a result of the recesses, the component 10 can be provided for example with a flat surface despite the partial deposition of (welding) material 4.

Alternatively to the present representations, the described method and/or the described component can relate to a stator blade for a turbomachine. Accordingly, a cover section or shroud (not explicitly identified) for the component 10 can be additively manufactured or built up by means of deposition welding, for example, similar to the blade root section SFA which is shown in FIG. 4.

Figure 6:
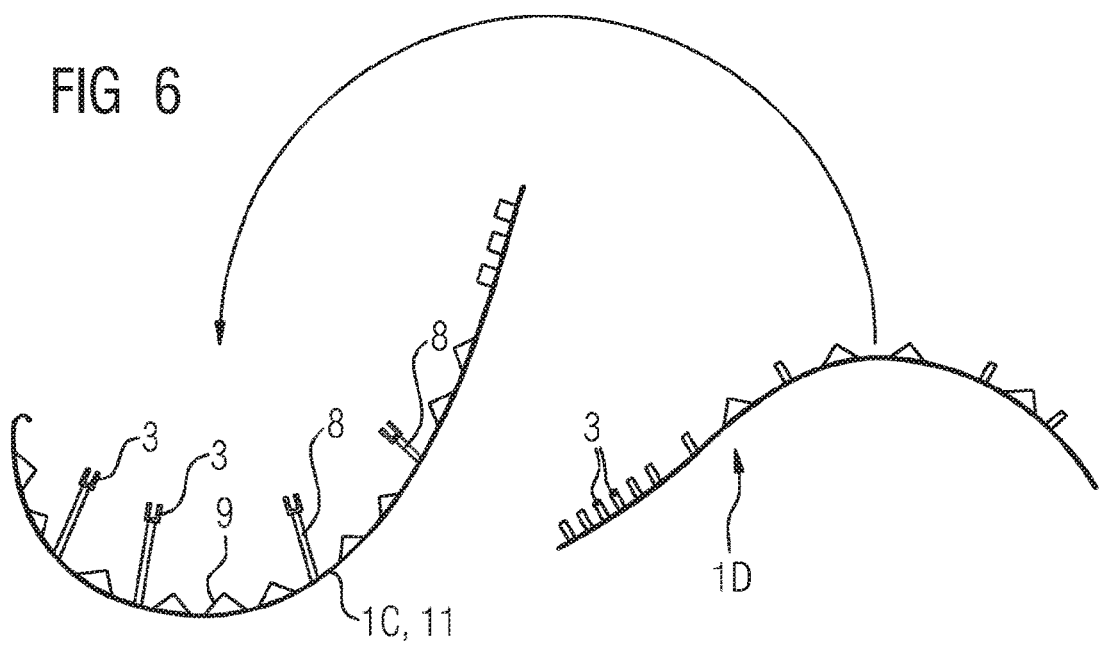
FIG. 6 shows a schematic plan view or outline of sections which are manufactured according to the invention in accordance with an alternative embodiment.

FIG. 6 shows a schematic plan view of sections 1 according to an alternative embodiment of the method and/or of the component of the present invention. The component 10 according to this embodiment is also advantageously a turbine blade, wherein only partial aspects of the manufacture or of the component are described, however.

In particular, in the left hand part a section 1C is shown in a simplified view. A flat convex or outer surface of the section 1C can for example recreate a pressure side of the turbine blade, although the (encasing) material 4 (not shown) can define the final circumference. A concave or inner surface of the wall, in contrast to the views of FIGS. 1 and 2, has for example a predefined structure, for example a cooling structure, which defines cooling passages (not explicitly identified) in the finished component 10. This structure (not further identified in the present case) is indicated by means of small angled elements which form the inner wall 9 or the inner surface. Also shown are support structure elements 8 which have connecting means 3 at one end (cf. above)

In the right hand part of FIG. 6, a section 1D is also shown in a simplified view.

The section 1D has advantageously been additively built up from the powder bed in such a way that for use in the finished component, for example for forming an inner cooling passage, it complementarily interacts or mates (or vice versa) with the section 1C.

The section 1D expediently has connecting means or elements (also identified by the designation 3) which are complementary to the connecting means 3 of the section 1C. Furthermore, the section 1D especially has a structured inner surface of inner wall 9, similar to the corresponding inner surface of the section 1C. The marked arrow also indicates for example the arranging of the sections 1C, 1D, forming a composite 2, similar to FIG. 2.

The advantage of the described method especially becomes clear with reference to FIG. 6, as a result of which the advantages of the additive production can be exploited and in particular its disadvantages can be largely circumvented. The referenced advantages especially relate inter alia to the possibility of building up tailored, complexly shaped structures directly from a 3D-CAD-dataset. For example, geometries which are not able to be manufactured, or are able to be manufactured only at excessive cost, by means of conventional manufacturing methods, are possible by means of additive manufacturing.

By the description based on the exemplary embodiments, the invention is not limited to these but covers each new feature and each combination of features. This especially contains each combination of features in the patent claims, even if this feature or this combination itself is not explicitly disclosed in the patent claims or exemplary embodiments.

The invention claimed is:

1. A method for additive manufacturing of a component, comprising:
additively building up a multiplicity of sections for the component by a powder bed-based method, wherein the multiplicity of the sections is provided with complementary connections during the additive building up in such a way that the sections are then connectable to each other in a form-fitting manner;
arranging the sections as a composite to form a cavity of the component, wherein the complementary connections of a first section comprise a projection extending away from a planar side surface of the first section configured to engage into a complementary groove recessed into a planar side surface of a second section, so that when the sections are connected to each other in a form-fitting manner along their respective sides, the projection extends entirely between the planar side surface of the first section and into the planar side surface of the second section to space the sections apart from one another to define a cooling passage between the planar side surfaces, wherein the projection extends through a portion of the cooling passage, and wherein a multiplicity of sections is mutually fixed after, or during the arranging; and additively finishing the component, wherein material is deposited along a circumferential direction around the composite of the sections by a deposition welding method in such a way that the sections are connected to each other in a substance-bonding manner.

2. The method as claimed in claim 1,
wherein the composite of the sections is completely encased by the material.

3. The method as claimed in claim 1,
wherein the complementary connections are designed to interact via a tongue and groove connection.

4. The method as claimed in claim 1,
wherein at least one of the sections forms an inner wall of the component.

5. The method as claimed in claim 1,
wherein the multiplicity of the sections form a multi-wall of the component.

6. The method as claimed in claim 1,
wherein the multiplicity of the sections is built up in such a way that they form an internal support structure of the component.

7. The method as claimed in claim 1, wherein at least one of the sections is aftermachined after the additive building up.

8. The method as claimed in claim 7,
wherein the at least one of the sections is aftermachined mechanically.

9. The method as claimed in claim 1,
wherein the sections are arranged on a prefabricated workpiece.

10. The method as claimed in claim 1,
wherein the component is a turbine blade, comprising a blade root section and blade airfoil section.

11. The method as claimed in claim 10,
wherein the turbine blade is a rotor blade for a gas turbine.

12. The method as claimed in claim 1,
wherein the component is a blade airfoil for a turbine blade.

13. The method as claimed in claim 12,
wherein the turbine blade is a rotor blade for a gas turbine.

* * * * *